Nov. 22, 1955  H. T. WEAVER  2,724,251
ZERO-BACKLASH COUPLING FOR SHAFTS OR THE LIKE
Filed Jan. 2, 1953

INVENTOR.
Hugh T. Weaver
BY
Attorney

United States Patent Office 2,724,251
Patented Nov. 22, 1955

2,724,251

ZERO-BACKLASH COUPLING FOR SHAFTS OR THE LIKE

Hugh T. Weaver, Grand Rapids, Mich., assignor to Lear, Incorporated, Grand Rapids, Mich.

Application January 2, 1953, Serial No. 329,170

7 Claims. (Cl. 64—15)

This invention relates to devices for coupling two rotatable members which are subject to axial misalignment, either due to relative eccentricity, angular displacement of the axes, or both such eccentricity and angular displacement. Furthermore, the invention has reference to a device of the character outlined which requires no tools to install and will retain its position on at least one of the coupled members notwithstanding removal of the other member.

In many installations a rotatable driven element and a rotatable driving element are required to be disconnected at relatively frequent intervals, e. g. for servicing. As an example, a potentiometer may be arranged to be connected to another device for mutual rotation, this latter being housed or made otherwise difficult of access, while the potentiometer is readily accessible for adjustment and cleaning. In such case a hole may be cut in the housing or partition which separates the driving and driven members to allow passage of the potentiometer shaft extension into proximity with the shaft of the other rotatable element. Inevitable minor misalignments are to be anticipated, and therefore the conventional sleeve and setscrew arrangements common to electronic apparatus are unsuitable since any misalignment of the axes of rotation is taken up only by forcible fitting, thus causing premature wear in the bearings and consequent malfunction of the coupled parts. In many cases the potentiometer is part of a circuit from which the utmost reliability in function must be anticipated, and a setting once established must be maintained at all costs. Many such instances arise in connection with electronically-operated automatic pilots for aircraft, where even a slight misadjustment which may be tolerable in other electronic organizations may give rise to extremely hazardous conditions.

Such demanding requirements dictate the exercise of every precaution against malfunction. It is therefore the principal object of this invention to provide a coupling element adaptable to the conditions outlined, and which shall be reliable, proof against vibration (such as may prevail in aircraft), inexpensive, simple to install, and which requires no lubrication or other maintenance.

Another object is to provide a coupling device not only characterized as aforesaid but capable of absorbing a substantial degree of axial backlash, i. e. end-play.

Other objects will become apparent from the description to ensue which, taken with the accompanying drawing, will disclose a preferred mode of carrying the invention into practice. In this drawing.

Figure 2:
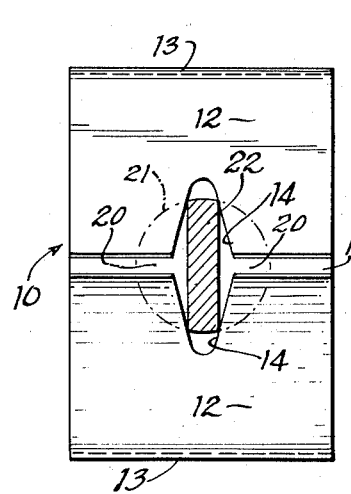
Fig. 2 is a vertical, transverse cross section taken on the line 2—2 of Fig. 1.

Broadly, the invention comprehends the provision of a one-piece element of resilient material including a rectangular body and two substantially U-shaped confronting portions at the ends thereof formed by bending, the free extremities being brought into juxtaposition, and each having a V-shaped notch therein. These latter are adapted to engage a tongue protruding from the end of a shaft forming part of one of the coupled elements, the dimensions of the notch being such that, in the operative position of the parts, at least one of the notches tightly engages the tongue in a substantially zero-backlash relationship. The parts of the device are so arranged that the said free extremities possess some degree of axial resiliency which is exerted as a force accommodating axial backlash, i. e. end-play, in either or both of the coupled members. The body portion is provided with an aperture to receive a tongue protruding from the end of a shaft forming part of the other coupled member and, on the edges of the aperture, resilient fingers are provided to grip, in a tight, frictional manner, the lateral surfaces of the tongue thereby to insure retention of the device on that one of the coupled members notwithstanding removal of the other coupled member.

Thus, turning to the drawing, the device comprises a one-piece structure 10 of resilient material, e. g. spring steel or Phosphor bronze, including a body portion 11 of any suitable form, e. g. rectangular, having inwardly bent-over ears 12—12 defining with the body a pair of confronting, substantially U-shaped bights 13—13, the free edges whereof are in alignment. In each of the ears 12—12 there is provided a substantially V-shaped notch 14 having a filleted bottom to reduce the hazard of failure by fatigue-cracking, these notches also being in diametrical opposition when referred to the shafts with which the device is associated. One such shaft 21 is shown only as exemplary, and is provided with a diametrically disposed tongue 22 of a size calculated to transmit the maximum torque for which the coupling device is designed. At this juncture it will be comprehended that the invention device is adapted basically to installations of comparatively low power and that the reduced cross-section of the shaft represented by the tongue 22 will be sufficient to afford the desired factor of safety.

Figure 1:
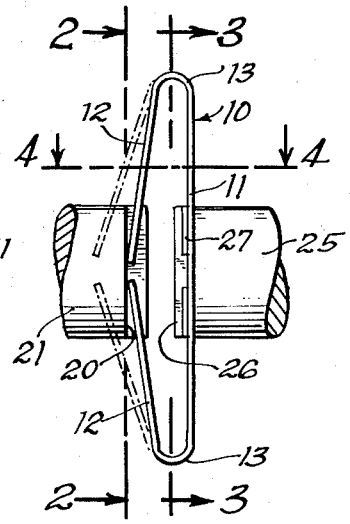
Fig. 1 shows a side elevational view of the coupling device associated with driving and driven shafts.
Figure 3:
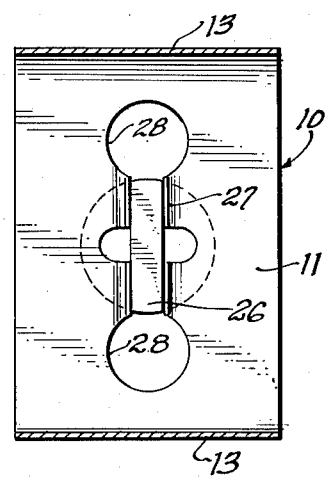
Fig. 3 is a vertical, transverse cross section taken on the line 3—3 of Fig. 1.

In that configuration of the device assumed by it when disassociated from the shaft 21, the legs 12—12 are substantially in the position indicated in phantom in Fig. 1, and the relationship of the parts is such that, upon assembly of the coupling with the driving and driven members the full-line position is assumed. Thus, the resiliency of the coupling is effective to exert axial force in both directions, thereby to counteract any undesirable end-play in the coupled shafts. Moreover, it will be clear that the dimension of a notch 14 with respect to the tongue 22 is such that, in the operative position, the edges of the V effectively grip the corners of the tongue (Fig. 2). Preferably the respective dimensions of the notch and tongue are so selected as to insure "zero-backlash" in a rotational sense. Moreover, it will be observed that the dimensions are also such that the extremities of the parts 12—12 bear against the shoulders 20—20, and this factor, together with the resiliency of the bights 13—13 are thereby availed of to minimize any undesirable end-play.

By virtue of the bights 13—13 some degree of lateral translation of the members 12—12 is permitted. Accordingly, ordinary eccentricity between the shafts may be accommodated without sacrifice of that degree of engagement between the members and the tongue necessitated by angular misalignment of the axes thereof.

Figure 4:
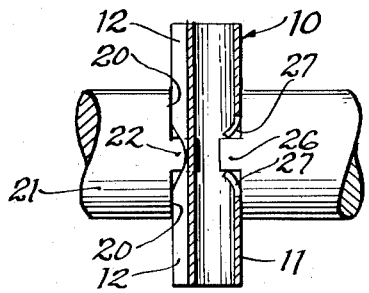
Fig. 4 is a horizontal, transverse cross section taken on the line 4—4 of Fig. 1.
Figure 5:
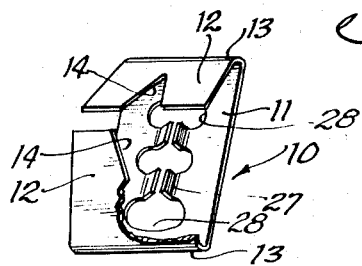
Fig. 5 is a perspective view of the device, inclined from the position occupied in the other views, to reveal certain details of construction.

Securement of the coupling to the other shaft 25 is effected by providing a second tongue 26 (similar to the tongue 22) at the end thereof, which is received between resilient ears 27 extending from the margins of an aperture 28 in the body 11. While any operative configuration of the aperture 28 which is adaptable to punch-press formation of the ears 27 may be selected, I prefer to employ arcs wherever possible. In this manner the possibility of failure by fatigue cracks is minimized, if not entirely eliminated. It will be noted that the transverse spacing between opposed ears 27 in their inoperative relation is made less than the thickness of the tongue 26. Thus, the resiliency of the material will allow snap-type engagement of the coupling with the tongue, and assure permanent retention of the same thereon. Furthermore, it will be observed that the free end of the ears 27 is bent at an angle of approximately 45° to the plane of the body portion 11 (Fig. 4) in order to present a sharp corner to the lateral faces of the tongue. Accordingly, any force tending to dislodge the device from the tongue 26 will cause the ears to penetrate the tongue and thereby resist dislodgment. This feature is of paramount importance in an installation wherein the coupling is not fully accessible as by being within a housing or behind a partition for, in such cases, the body 11 may be positioned on the inaccessible side and, when the shaft 21 is disconnected the coupling will be retained with the shaft 25 rather than being pulled away with the shaft 21. Should the latter occur it may require disassembly of a number of parts to re-fit the coupling. In this latter phase it must be remembered that the aperture through the partition or housing wall may be only large enough to receive the shaft 21, and not clear the coupling proper.

It will be apparent that the shafts 21 and 25 are part of, or operatively connected to, driving and driven members (not shown).

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. Means for coupling a pair of rotatable members having substantially aligned axes of rotation comprising an element constructed and arranged to form a part of each said member, said elements being mutually confronting and spaced apart axially and each provided with a diametrically disposed tongue having a non-circular, transverse cross section and a thin, flat one-piece member having a body part and at least one extension substantially parallel to said body part and constituted as a bent-over portion of said body part, the free end of said extension having a V-shaped notch engaging one of said tongues, and said body part having a non-circular aperture including a resilient marginal finger for engagement over said other tongue.

2. Means for coupling a pair of rotatable members having substantially aligned axes of rotation comprising an element constructed and arranged to form a part of each said member, said elements being mutually confronting and spaced apart axially and each provided with a diametrically disposed tongue having a non-circular, transverse cross section and a thin, flat one-piece member having a body part and a pair of extensions at each end thereof and substantially parallel thereto constituted as bent-over portions of said body part, the free end of each said extension having a substantially V-shaped notch engaging one of said tongues at diametrically-positioned ends thereof, and said body part having a non-circular aperture engaged over said other tongue, said aperture having resilient, marginal fingers for gripping said other tongue.

3. Means for coupling a pair of rotatable members having substantially aligned axes of rotation comprising an element constructed and arranged to form a part of each said member, said elements being mutually confronting and spaced apart axially and each provided with a diametrically disposed tongue having a substantially rectangular cross section in a plane transverse to the axis of the shaft, and a one-piece member including a body portion having an aperture to pass one of said tongues and a plurality of resilient lugs having parallel confronting faces and adjacent said aperture for gripping the lateral faces of one tongue, said body portion having a returned extension at each end thereof defining with the body portion substantially U-shaped configurations with the respective ends of the free legs of the U confronting each other, each said end having a substantially V-shaped notch therein, the dimensions and disposition of the notches being such as to engage on opposite ends of the other of said tongues.

4. Means for coupling a pair of rotatable members having substantially aligned axes of rotation comprising an element constructed and arranged to form a part of each said member, said elements being mutually confronting and spaced apart axially and each provided with a diametrically disposed tongue having a substantially rectangular cross section in a plane transverse to the axis of the shaft, and a one-piece member including a body portion having an aperture, the margin of which is provided with at least one straight portion for non-rotatable engagement with a face of one of said tongues, said body portion having a pair of oppositely disposed extensions constituted as parts of said body portion and returned thereupon in mutually-confronting relation, said parts being positioned at an acute angle to said body portion and the confronting edges of the free ends thereof each having a notch for engagement with opposite ends of the other of said tongues, the relationship and dimensions of the notches and tongue being such that upon assembly of the device with the tongues the said parts are caused to diverge from the body portion to grip resiliently said tongue in a diametrical sense.

5. Means for coupling a rotatable driving member to a rotatable driven member having substantially aligned axes of rotation comprising a parallelepipedic element constructed and arranged to form a part of each said member, said elements being mutually confronting and spaced apart axially, and a one-piece member of resilient, thin, flat form including a body portion having aperture, the margin of which is provided with at least one straight portion for non-rotatable engagement with a face of one of said elements and at least one extension forming with said body portion a hairpin spring, said extension having a V-shaped notch engaged over a pair of adjacent corners of the other said element.

6. Coupling means in accordance with claim 5 wherein one of said elements is outstanding from a plane of the rotatable member individual thereto which is transverse to the axis of rotation to define a pair of shoulders, and the portions of the extension at each side of the notch abut said shoulders to accommodate end-play between the coupled members.

7. Coupling means in accordance with claim 5 further characterized in that there is provided an axially extending lug adjacent said margin engageable with a lateral face of the element individual thereto.

References Cited in the file of this patent

UNITED STATES PATENTS

| | | |
|---|---|---|
| 2,246,750 | Murphy | June 24, 1941 |
| 2,367,659 | Burke | Jan. 23, 1945 |

FOREIGN PATENTS

| | | |
|---|---|---|
| 570,282 | Germany | 1933 |